US006537079B1

(12) United States Patent
Chen

(10) Patent No.: US 6,537,079 B1
(45) Date of Patent: Mar. 25, 2003

(54) MODULAR EDUCATIONAL IMPLEMENT STRUCTURE

(76) Inventor: Shan-Ming Chen, P.O. Box 453, Taichung (TW)

( * ) Notice: Subject to any disclaimer, the term of this patent is extended or adjusted under 35 U.S.C. 154(b) by 0 days.

(21) Appl. No.: 10/025,871

(22) Filed: Dec. 26, 2001

(51) Int. Cl.[7] .............................. B43L 1/00; B43L 7/00
(52) U.S. Cl. ........................ 434/418; 434/365; 206/579
(58) Field of Search ................................. 434/418, 419, 434/420, 365; 446/120, 122, 125, 129; 206/579

(56) References Cited

U.S. PATENT DOCUMENTS 5,690,446 A * 11/1997 Poissant et al. ............. 403/169

* cited by examiner

Primary Examiner—Jacob K. Ackun
Assistant Examiner—Bena B. Miller
(74) Attorney, Agent, or Firm—Harrison & Egbert

(57) ABSTRACT

A modular educational implement structure comprises a plurality of component units of the standardized size, design, shape, etc. the component units can be arranged or fitted together in a variety of ways so as to make the implement structure adaptable to various uses and functions.

4 Claims, 12 Drawing Sheets

MODULAR EDUCATIONAL IMPLEMENT STRUCTURE

BACKGROUND OF THE INVENTION

1. Field of the Invention

The present invention relates generally to an educational implement, and more particularly to a modular and versatile educational implement structure.

2. Description of Related Art

As shown in FIG. 1, two prior art educational implements are respectively made integrally and are limited in use and function. One of the two prior art educational implements has a triangular shape and a fixed framework. Other one of the two prior art educational implements has a semicircular shape and a fixed framework. These two prior art educational implements are very limited in versatility. In addition, both implements can be used to draw a line. Such a functional duplication is a reflection of the inherent deficiency of the prior art educational implements. In addition, the prior art educational implements are not cost-effective in terms of space occupation, packaging cost, shipping cost, production cost, and material cost.

BRIEF SUMMARY OF THE INVENTION

The primary objective of the present invention is to provide a modular educational implement structure with is also versatile, efficient, and economical.

In keeping with the principle of the present invention, the foregoing objective of the present invention is attained by the modular educational implement structure comprising units of the standardized size, design, shape, and the like. The units can be arranged or fitted together in a variety of ways, so as to make the educational implement adaptable to many uses and functions.

The features and the advantages of the present invention will be more readily understood upon a thoughtful deliberation of the following detailed description of the present invention with reference to the accompanying drawings.

DETAILED DESCRIPTION OF THE INVENTION

Figure 1:
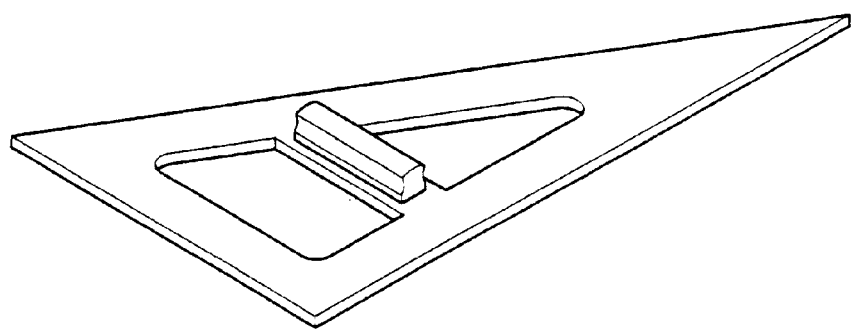
FIG. 1 shows a perspective view of two prior art educational implements.
Figure 1:
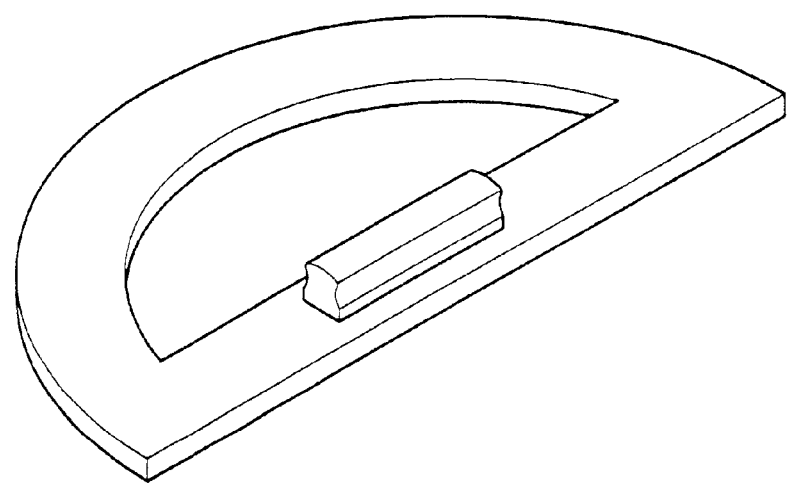
Figure 2:
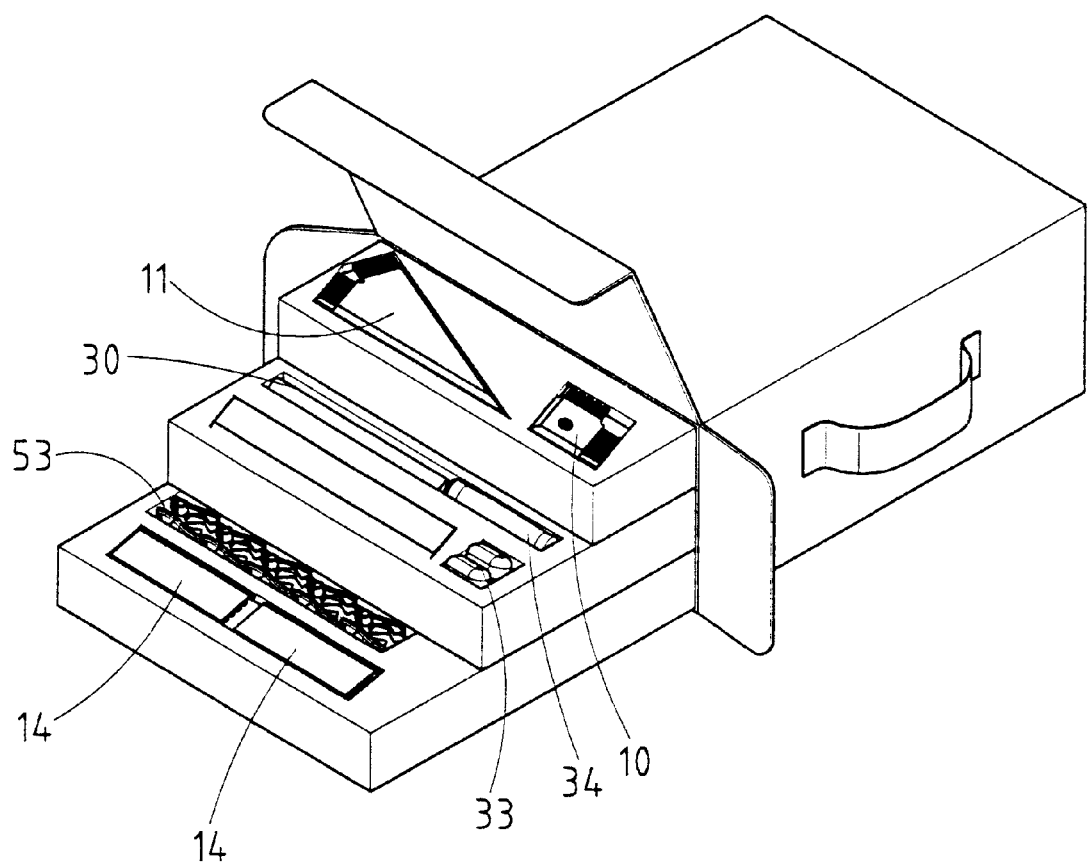
FIG. 2 shows a schematic perspective view of the present invention.
Figure 3:
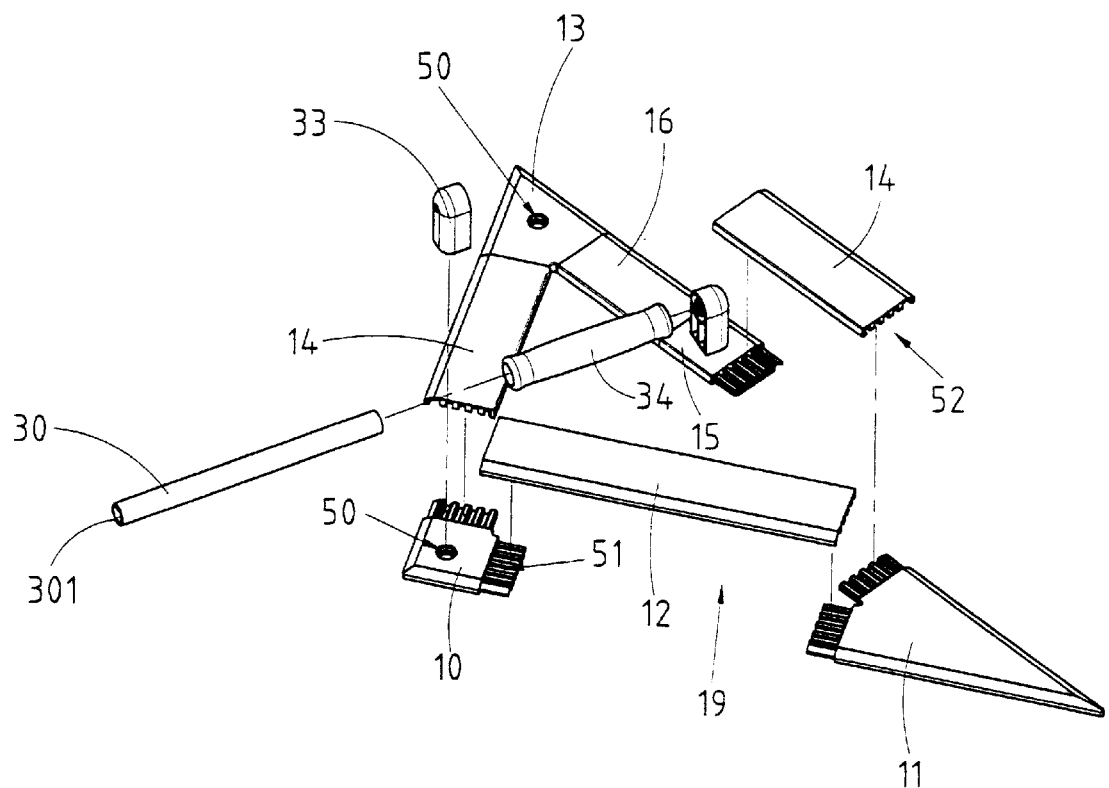
FIGS. 3–7 are schematic views of the present invention adaptable to various uses.

As shown in FIGS. 2–12, a modular educational implement structure embodied in the present invention is formed of the following units.

A retaining member set 19 is formed of a plurality of retaining straight plates 12, 14, 15, and 16, retaining arcuate plates 17 and 18, angled plates 10, 11 and 13. These plates are provided with a retaining hole 50, a retaining structure 51 or 52.

A plurality of tubular members 30 are provided in the interior with a position-confining projection 301. The tubular members 30 have an appropriate length.

A plurality of connection members 31 are provided with a connection segment 312 cooperative with the tubular members 30, and with a stop edge 311.

A press member 32 is provided with a connection segment 321 by means of which the press member 32 is connected to one end of the tubular members 30 for pressing against a reference surface.

A plurality of holding members 33 are provided with a holding segment 331, a connection structure 332, and a pivoting hole 333. The holding segment 331 is engageable with the retaining hole 50 of the retaining member set 19. The holding segment 331 and the connection structure 332 are cooperative with the end portions of the tubular members 30. The connection structure 332 cooperates with the position-confining projection 301 of the tubular members 30 to form an appropriate profile. Two holding members 33 can be pivoted together by making use of the pivoting hold 333 of the holding members 33.

A grip body 34 is fitted over the tubular members 30 to facilitate the gripping of the tubular members 30.

A staff plate 35 is provided with a plurality of connection holes 351 which are arranged equidistantly and are provided with a retaining groove 352. The staff plate 35 is further provided with a retaining hold 50.

A plurality of clamping members 53 are provided with a locating structure 531 having a retaining block 532. The clamping members 53 are used in conjunction with the tubular member 30 or the staff plate 35.

Figure 4:
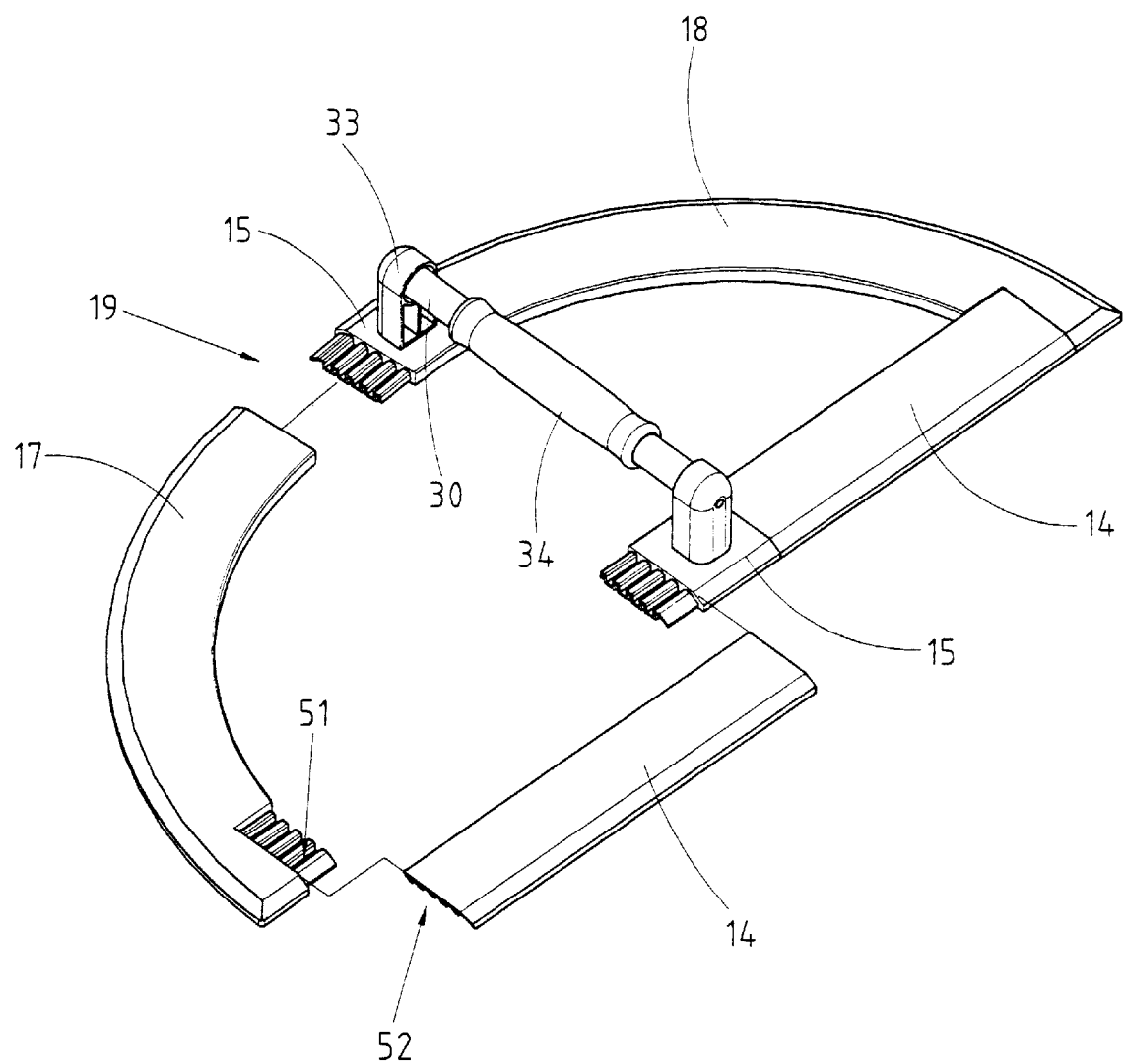
Figure 5:
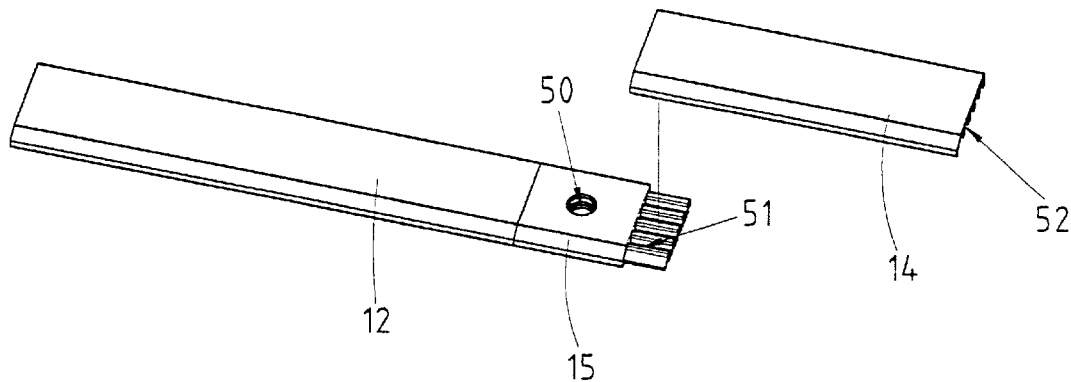
Figure 6:
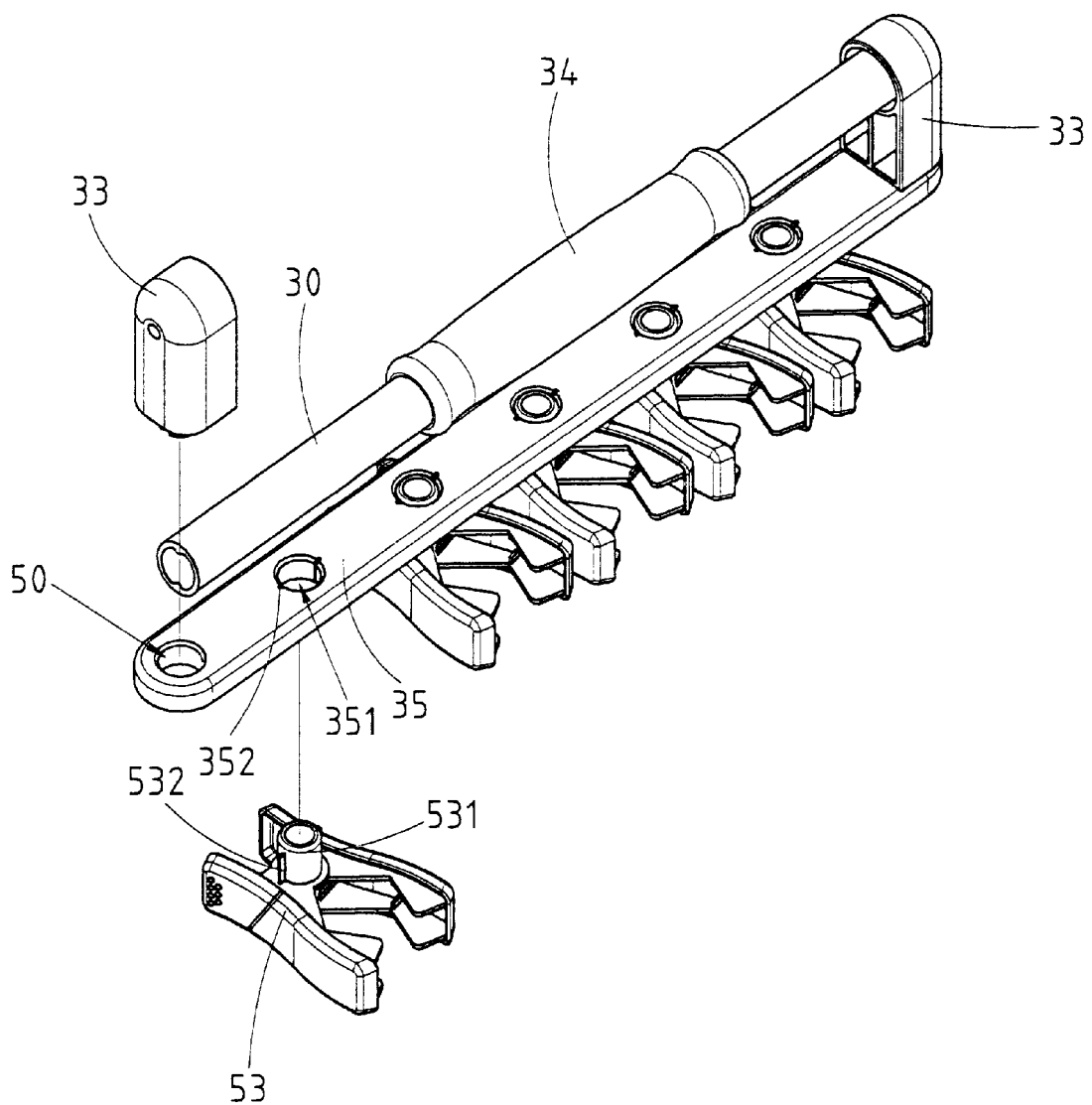
Figure 7:
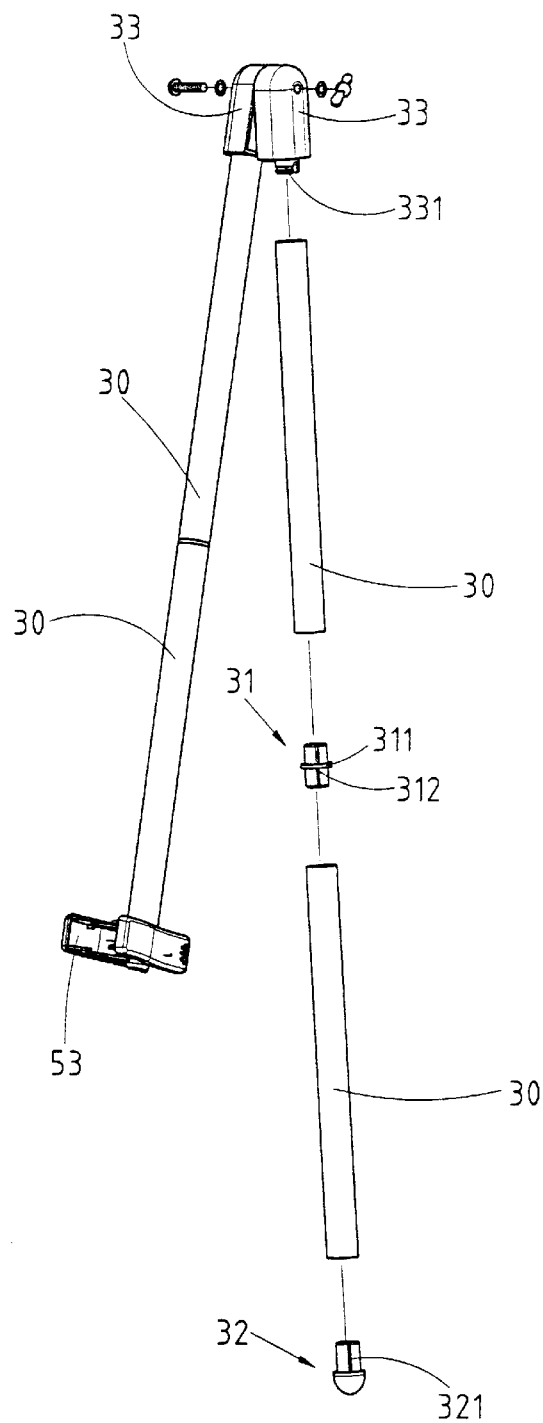
Figure 8:
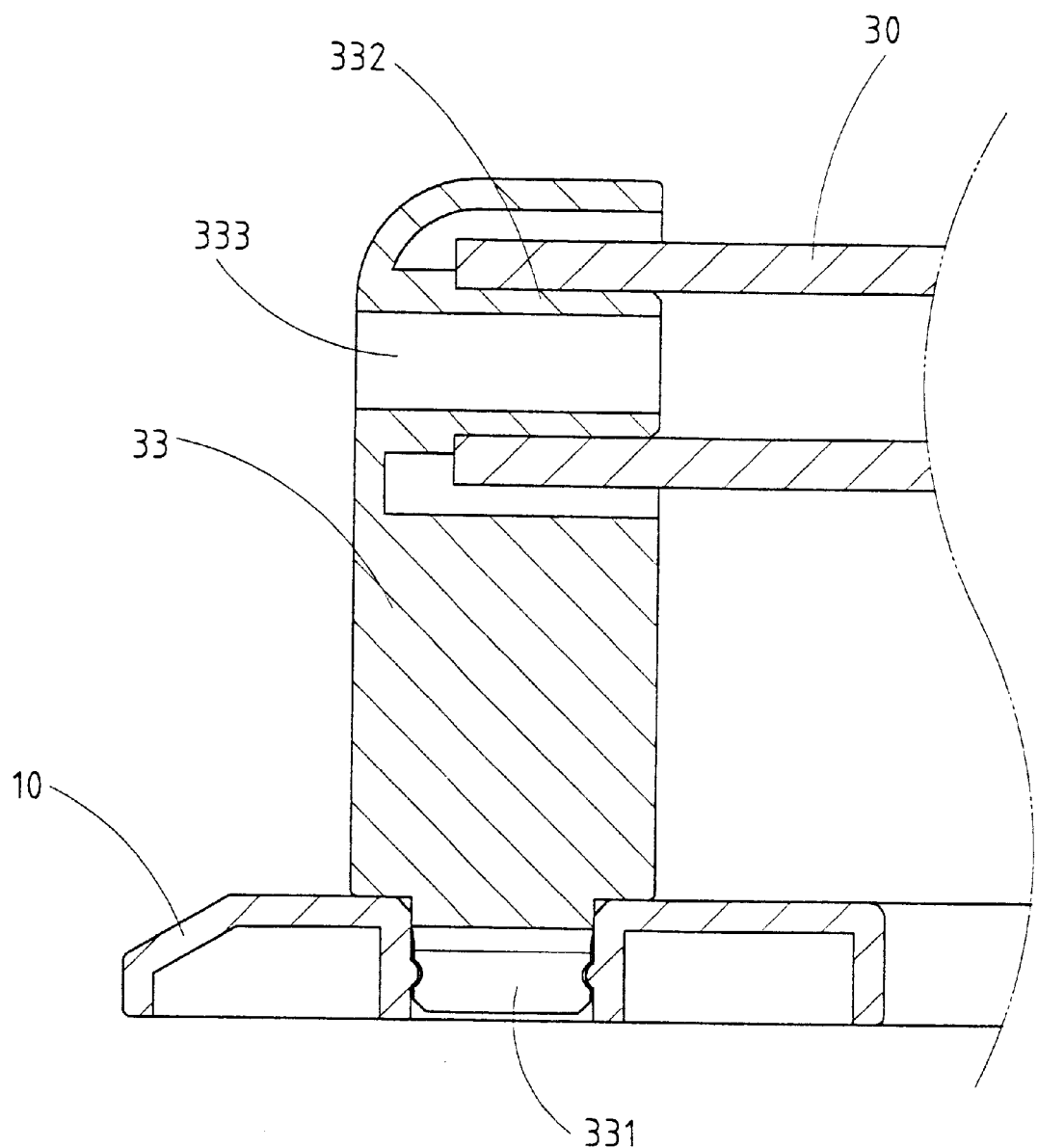
FIG. 8 shows a sectional view of the present invention.
Figure 9:
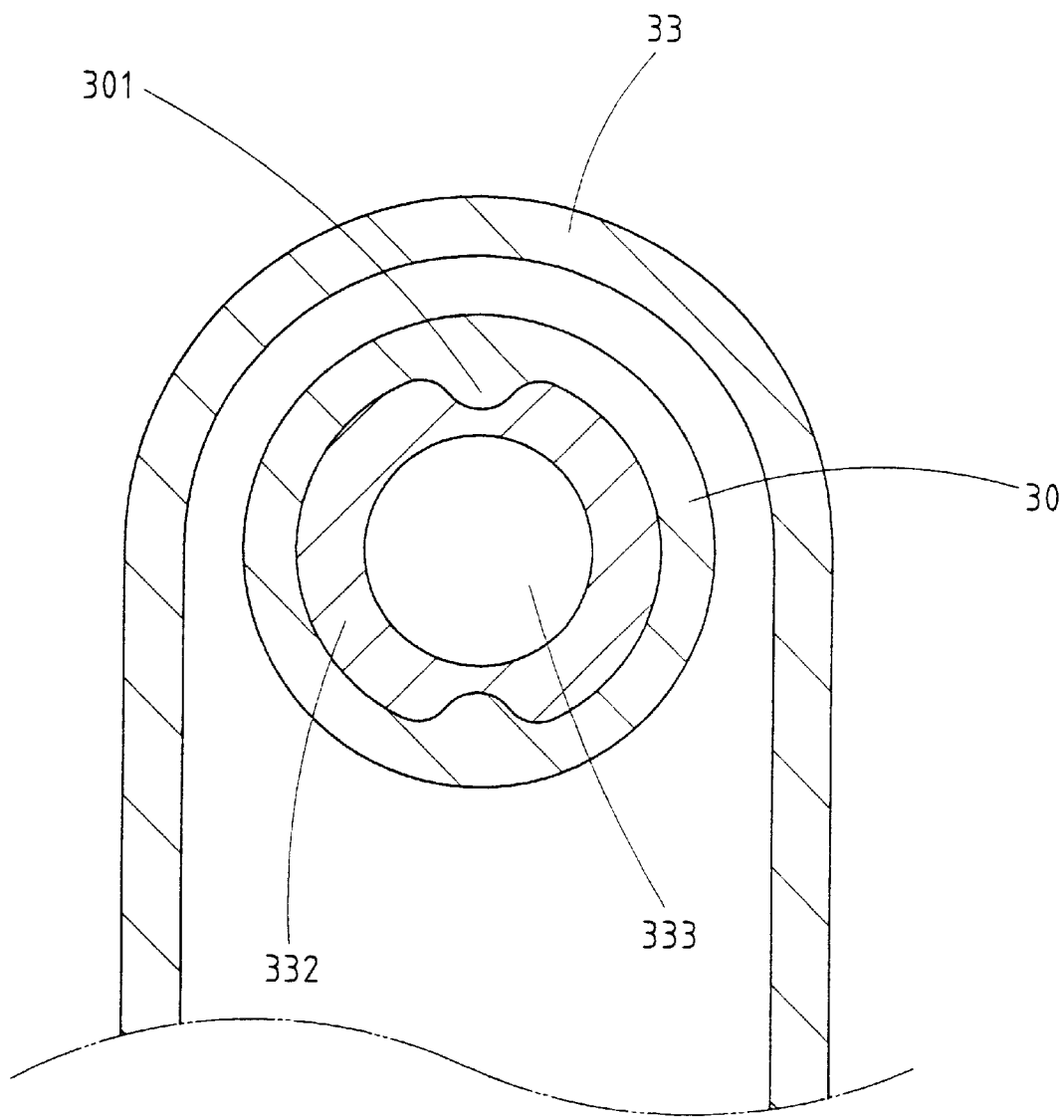
FIG. 9 shows another sectional view of the present invention.
Figure 10:
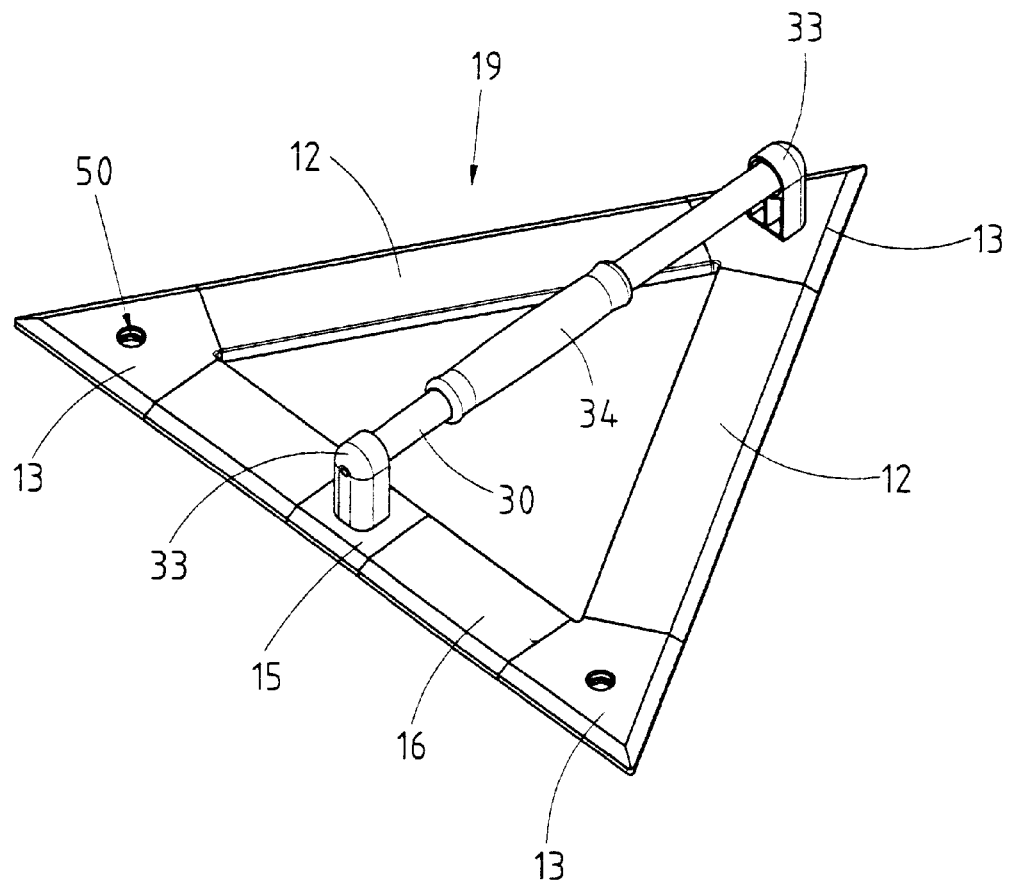
FIGS. 10–12 are schematic views of the present invention in use.
Figure 11:
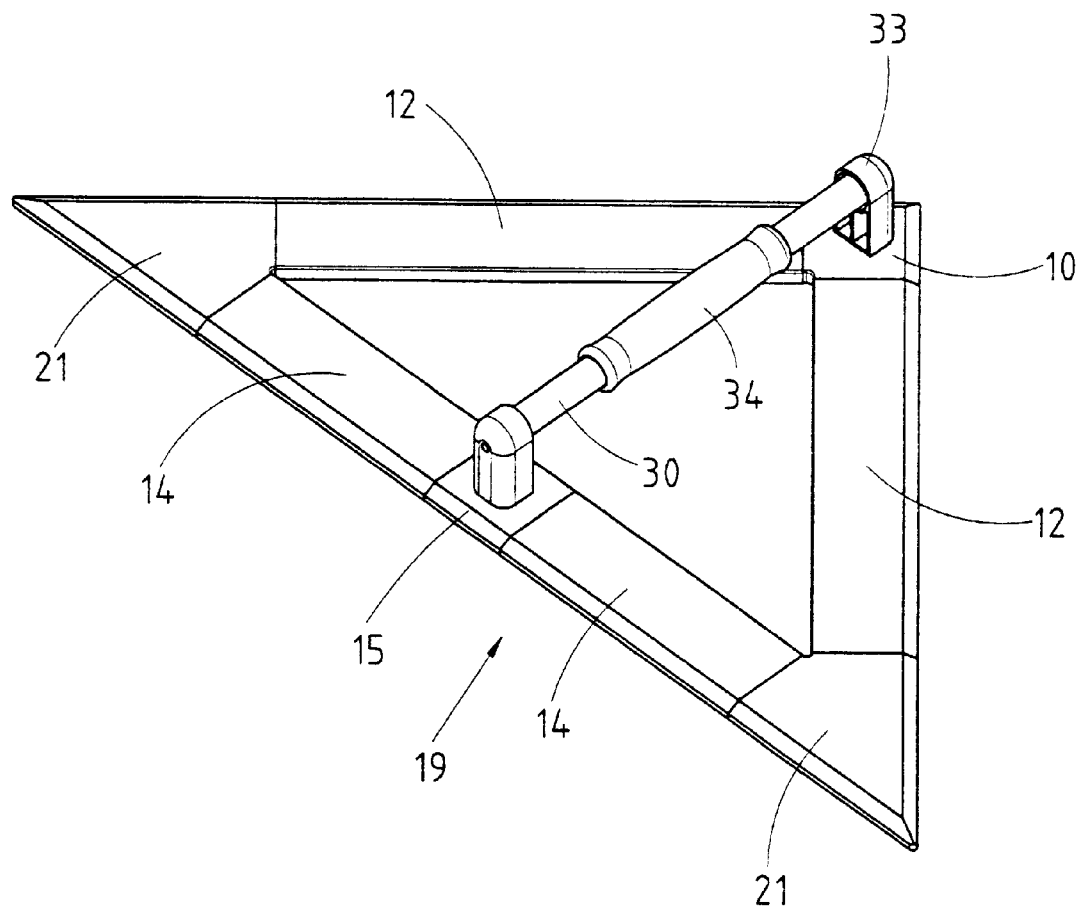
Figure 12:
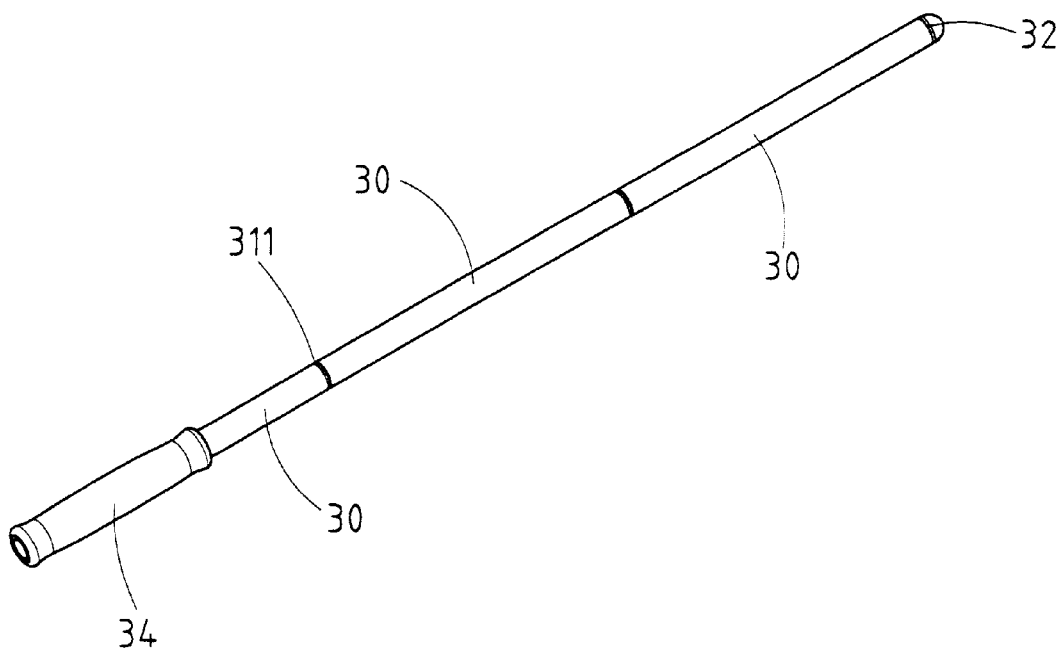

The component units of the present invention are detachably fitted together in various ways to form various educational implements. For example, the angled plates 10, 11 and 13 are arranged together with the retaining straight plates 12, 14, 15 and 16 in conjunction with the tubular members 30 and the holding members 33 such that the retaining segment 331 of the holding member 33 is retained in the retaining hole 50 of the retaining member set 19, and that the tubular member 30 is disposed between the connection structures 332 of two holding members 33, thereby resulting in formation of various educational implements, such as triangular implements and rulers, as shown in FIGS. 3, 5, 10, and 11. The angled plates 10, 11 and 13 are replaced by the arcuate plates 17 and 18 to form an angle gauge, as shown in FIG. 4. A plurality, of tubular members 30 are connected end to end in conjunction with the connection members 31 to form a pointer, as shown in FIG. 12. A pair of compasses is formed by two holding members 33 in conjunction with a plurality of tubular members 30 and connection members 31, a press member 32, and a clamping member 53, as shown in FIG. 7. A staff board is formed, as shown in FIG. 6, by the staff plate 35 and a plurality of clamping members 53 which are held in the connection holes 351 of the staff plate 35 by the locating structures 531 of the clamping members 53 such that the retaining blocks 532 are located in the retaining grooves 352 of the connection holes 351 of the staff plate 35. In addition a tubular member 30 is added in conjunction with two holding members 33. The tubular member 30 is provided with the grip body 34 fitted thereover.

The present invention described above is to be regarded in all respects as being illustrative and nonrestrictive. Accordingly, the present invention may be embodied in other specific forms without deviating from the spirit thereof. The present invention is therefore to be limited only by the scopes of the following claims.

I claim:

1. A kit having module implements comprising:

a plurality of retaining members of various shapes, said plurality of retaining members each having a retaining structure and a retaining hole, said plurality of retaining members being of generally planar configuration;

a plurality of tubular members each of a predetermined length;

a plurality of connection members each having a connection segment, said connection segment being removably received within an end of a respective tubular member of said plurality of tubular members;

a press means having a connection segment formed thereon, said connection segment formed thereon, said connection segment of said press means being removably reserved within another end of a receptive tubular member of said plurality of tubular members, said press means for pressing against a reference surface;

a plurality of holding members each having a holding segment and a connection segment and a pivot means, the holding segment and the connection segment being cooperative with end portions of respective tubular members of said plurality of tubular members, said pivot means for pivoting two of said plurality of holding members relative to one another, said plurality of holding members having an identical shape;

a staff plate having a plurality of connection holes formed therein in equidistantly-spaced relationship, each of said plurality of connection holes having a retaining groove formed therein, and said staff plate having a retaining hole formed therein; and a plurality of clamping members each having a locating structure removably engaged within a respective connection hole of said plurality of connection holes, each of said plurality of clamping members having a retaining block formed therein, each of said plurality of clamping members having a pair of clamping arms extending outwardly therefrom.

2. The kit of claim 1, further comprising:

a grip body fitted over one of said plurality of tubular members.

3. The kit of claim 1, each of said plurality of tubular members having a projection means formed thereon, said projection means for fixedly receiving an end portion of the connection member and said press means.

4. The kit of claim 1, said plurality of retaining members comprising a plurality of straight plates and a plurality of angled plates and a plurality of angled plates.

* * * * *